(12) United States Patent
     Datla et al.

(10) Patent No.: US 12,561,576 B2
(45) **Date of Patent: *Feb. 24, 2026**

(54) PROCESSOR SYSTEM AND METHOD FOR INCREASING DATA-TRANSFER BANDWIDTH DURING EXECUTION OF A SCHEDULED PARALLEL PROCESS

(71) Applicant: Deep Vision Inc., Los Altos, CA (US)

(72) Inventors: Raju Datla, Hyderabad (IN);
     Mohamed Shahim, Thrissur (IN);
     Suresh Kumar Vennam, Hyderabad
     (IN); Sreenivas Aerra Reddy,
     Hyderabad (IN)

(73) Assignee: Deep Vision Inc., Los Altos, CA (US)

( * ) Notice:  Subject to any disclaimer, the term of this
     patent is extended or adjusted under 35
     U.S.C. 154(b) by 0 days.

This patent is subject to a terminal dis-
     claimer.

(21) Appl. No.: 18/671,756

(22) Filed: May 22, 2024

(65) Prior Publication Data

US 2024/0354594 A1      Oct. 24, 2024

Related U.S. Application Data

(63) Continuation of application No. 17/984,763, filed on
     Nov. 10, 2022, now Pat. No. 12,026,628, which is a
     (Continued)

(51) Int. Cl.
     *G06N 3/10*       (2006.01)
     *G06F 13/16*      (2006.01)
     (Continued)

(52) U.S. Cl.
     CPC ........... *G06N 3/10* (2013.01); *G06F 13/1673*
     (2013.01); *G06F 13/1689* (2013.01);
     (Continued)

(58) Field of Classification Search
     CPC ... G06N 3/10; G06N 3/04; G06N 3/08; G06F
     13/1673; G06F 13/1689; G06F 13/28
     See application file for complete search history.

(56) References Cited

U.S. PATENT DOCUMENTS 5,535,417 A *  7/1996 Baji ......................... G06F 13/28
                                                      710/33
5,584,010 A * 12/1996 Kawai ..................... G06F 13/28
                                                      710/308
(Continued)

FOREIGN PATENT DOCUMENTS

JP         H07306810 A    11/1995
JP         H08320827 A    12/1996
            (Continued)

OTHER PUBLICATIONS

European Search Report received in App. No. EP21862919.4 dated
Jan. 2, 2024.
(Continued)

*Primary Examiner* — Henry Tsai
*Assistant Examiner* — Aurangzeb Hassan
(74) *Attorney, Agent, or Firm* — Run8 Patent Group,
LLC; Peter Miller; Brian T. Chew

(57)           ABSTRACT

A broadcast subsystem of a processor system includes: a set
of broadcast buses, each broadcast bus in the set of broadcast
buses electrically coupled to a subset of primary memory
units in the set of primary memory units; a primary memory
unit queue: configured to store a first set of data transfer
requests associated with the set of primary memory units;
electrically coupled to the data buffer a broadcast scheduler:
electrically coupled to the primary memory unit queue;
electrically coupled to the set of broadcast buses; and
configured to transfer source data from the data buffer to a
target subset of primary memory units in the set of primary
                    (Continued)

memory units via the set of broadcast buses based on the set of data transfer requests stored in the primary memory unit queue.

20 Claims, 4 Drawing Sheets

Related U.S. Application Data continuation of application No. 17/461,221, filed on Aug. 30, 2021, now Pat. No. 11,526,767.

(60) Provisional application No. 63/071,874, filed on Aug. 28, 2020.

(51) Int. Cl.

| | |
|---|---|
| *G06F 13/28* | (2006.01) |
| *G06N 3/04* | (2023.01) |
| *G06N 3/08* | (2023.01) |

(52) U.S. Cl.
CPC ............... *G06F 13/28* (2013.01); *G06N 3/04* (2013.01); *G06N 3/08* (2013.01)

(56) References Cited

U.S. PATENT DOCUMENTS

| | | | | |
|---|---|---|---|---|
| 5,887,146 | A * | 3/1999 | Baxter .................... | G06F 11/22 |
| | | | | 714/E11.16 |
| 7,865,674 | B2 | 1/2011 | Gower et al. | |
| 11,461,579 | B2 * | 10/2022 | Franca-Neto ............ | G06N 3/08 |
| 11,615,322 | B1 * | 3/2023 | Thomas ................... | G06N 5/00 |
| | | | | 717/145 |
| 11,625,453 | B1 * | 4/2023 | Meyer ................. | G06F 15/8046 |
| | | | | 706/15 |

| | | | | |
|---|---|---|---|---|
| 2005/0289253 | A1 * | 12/2005 | Edirisooriya .......... | G06F 13/28 |
| | | | | 710/22 |
| 2009/0063784 | A1 | 3/2009 | Gower et al. | |
| 2019/0251034 | A1 | 8/2019 | Guim et al. | |
| 2020/0035762 | A1 | 1/2020 | Kim et al. | |
| 2020/0043123 | A1 * | 2/2020 | Dash ..................... | G06F 9/4881 |
| 2020/0210301 | A1 * | 7/2020 | Nandan ............... | G06F 11/2236 |
| 2021/0258988 | A1 * | 8/2021 | Balakrishnan .......... | G06N 3/08 |
| 2022/0035762 | A1 * | 2/2022 | Zhang ................. | G06F 13/4068 |

FOREIGN PATENT DOCUMENTS

| | | | |
|---|---|---|---|
| JP | 2014230261 | A | 12/2014 |
| JP | 2015532990 | A | 11/2015 |
| JP | 2016524745 | A | 8/2016 |
| JP | 2017111802 | A | 6/2017 |
| JP | 2018514872 | A | 6/2018 |
| JP | 2018533792 | A | 11/2018 |
| JP | 2020524318 | A | 8/2020 |
| JP | 2021526277 | A | 9/2021 |
| WO | 2014051736 | A1 | 4/2014 |
| WO | 2020078470 | A1 | 4/2020 |

OTHER PUBLICATIONS

Japanese Office Action received in App. No. 2023-537883 dated Apr. 25, 2024.
Snaider Carrillo et al: "Scalable hierarchical network-on-chip architecture for spiking neural network hardware implementations" , IEEE Transactions on Parallel and Distributed Systems, vol. 24, No. 12, Oct. 3, 2012 (Oct. 3, 2012), pp. 2451-2461.
Stevens Jacob R et al: "Manna An Accelerator for Memory-Augmented Neural Networks", Proceedings of the 52nd Annual IEEE/ACM International Symposium on Microarchitecture, Micro '52, ACM Press, New York, New York, USA, Oct. 12, 2019 (Oct. 12, 2019), pp. 794-806.

* cited by examiner

S100, S130, S170

"UNICAST MODE"

S100, S120, S160

"MULTICAST MODE"

S100, S120, S160

S100, S120, S160

PROCESSOR SYSTEM AND METHOD FOR INCREASING DATA-TRANSFER BANDWIDTH DURING EXECUTION OF A SCHEDULED PARALLEL PROCESS

CROSS-REFERENCE TO RELATED APPLICATIONS

This application is a continuation of U.S. patent application Ser. No. 17/984,763, filed on 10 Nov. 2022, which is a continuation of U.S. patent application Ser. No. 17/461,221, filed on 30 Aug. 2021, which claims the benefit of U.S. Provisional Application No. 63/071,874, filed on 28 Aug. 2020, each of which is incorporated in its entirety by this reference.

This application is related to U.S. Pat. No. 10,474,464, filed on 3 Jul. 2018, U.S. patent application Ser. No. 17/127, 904, filed on 18 Dec. 2020, U.S. patent application Ser. No. 17/211,707, filed on 24 Mar. 2021, U.S. patent application Ser. No. 17/331,585, filed on 26 May 2021, U.S. patent application Ser. No. 17/331,590, filed on 26 May 2021, each of which is incorporated in its entirety by this reference.

TECHNICAL FIELD

This invention relates generally to the field of integrated circuit design and more specifically to a new and useful processor system and method for increasing data-transfer bandwidth during execution of a scheduled parallel process.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Processor System

Figure 1:
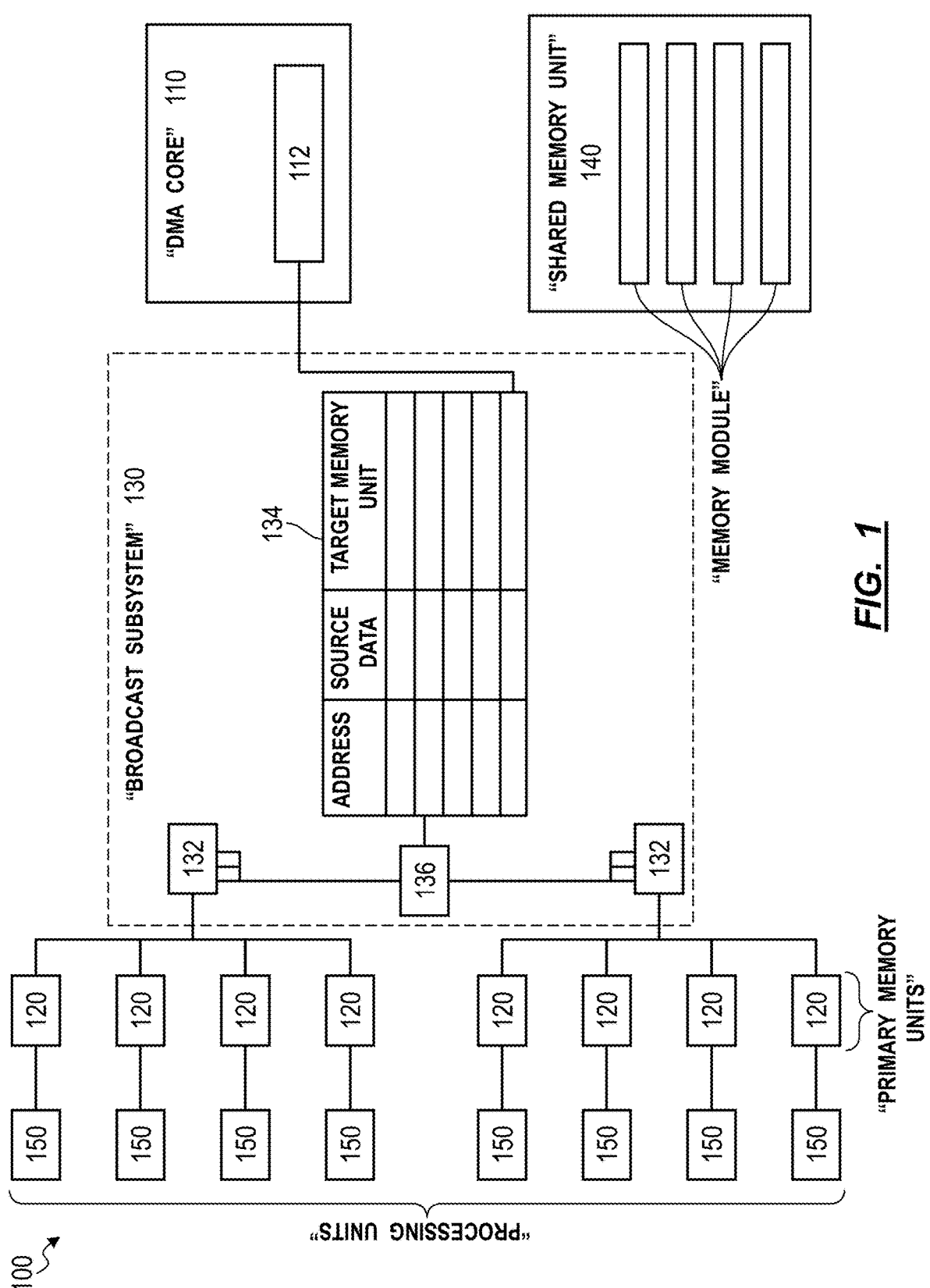
FIG. 1 is a schematic representation of a processor system.

As shown in FIG. 1, a processor system 100 includes: a direct memory access core 110 comprising a data buffer 112; a set of primary memory units 120; and a broadcast subsystem 130. The broadcast subsystem 130 includes: a set of broadcast buses 132, each broadcast bus 132 in the set of broadcast buses 132 electrically coupled to a subset of primary memory units 120 in the set of primary memory units 120; a primary memory unit queue 134; and a broadcast scheduler 136. The primary memory unit queue 134 is:

configured to store a first set of data transfer requests associated with the set of primary memory units 120; and electrically coupled to the data buffer 112. The broadcast scheduler 136 is: electrically coupled to the primary memory unit queue 134; electrically coupled to the set of broadcast buses 132; and configured to transfer source data from the data buffer 112 to a target subset of primary memory units 120 in the set of primary memory units 120 via the set of broadcast buses 132 based on the set of data transfer requests stored in the primary memory unit queue 134.

2. Method

Figure 2:
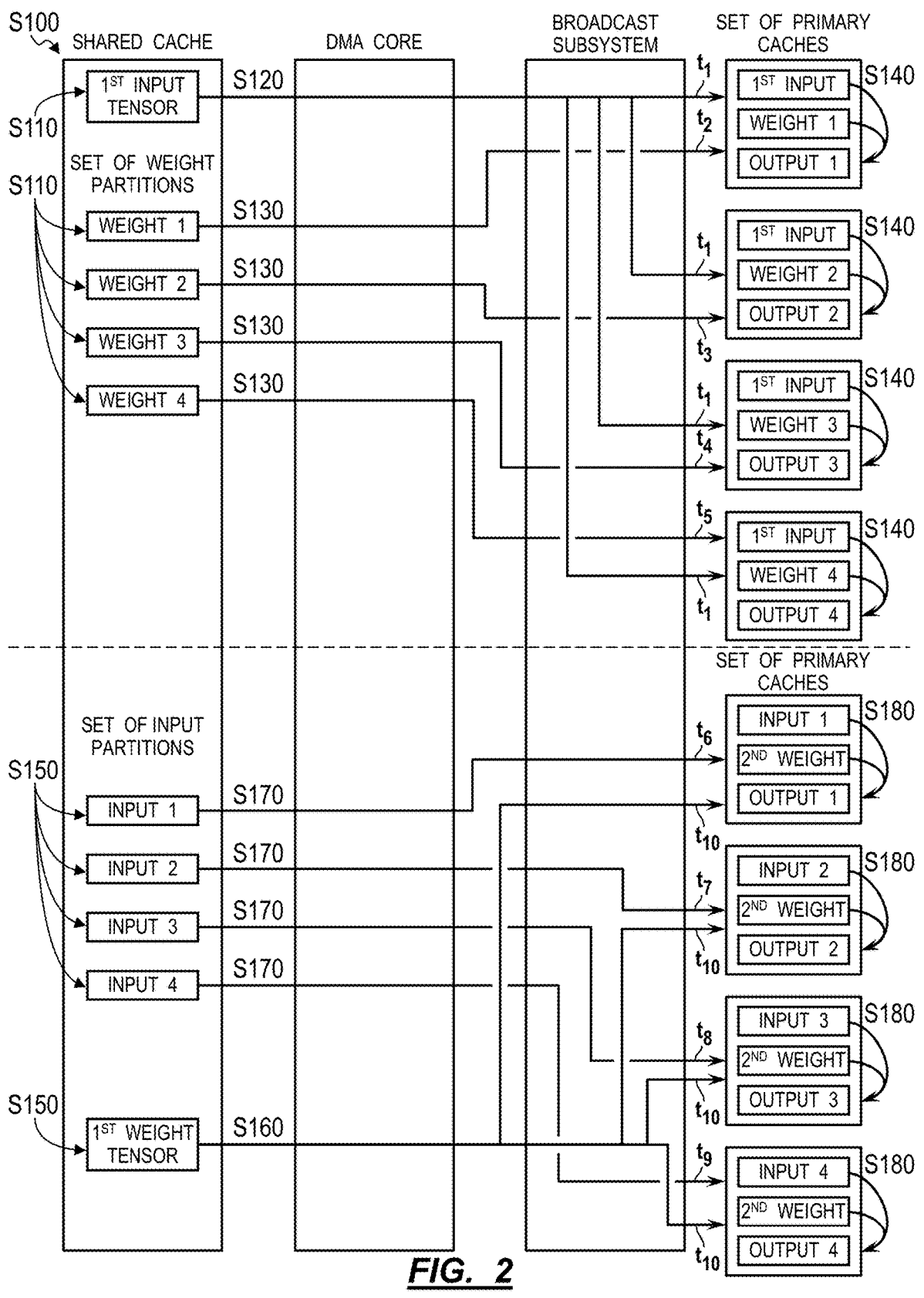
FIG. 2 is a flowchart representation of a method.

As shown in FIG. 2, a method S100 is executed by a neural network at a processor system 100 including a shared memory unit 140, a set of primary memory units 120, and a set of processing units 150. The method S100 includes storing, in the shared memory unit 140: a first weight tensor at a first source address, the first weight tensor including a set of weight tensor partitions; and a first input tensor at a second source address, the first input tensor larger than the first weight tensor in Block S110. The method S100 also includes broadcasting the first input tensor from the second source address to a first relative destination address in the set of primary memory units 120 in Block S120. The method S100 additionally includes, for each processing unit 150 in the set of processing units 150: transferring a weight tensor partition in the set of weight tensor partitions from the first source address to a first destination address in the primary memory unit 120 of the processing unit 150 in Block S130; and, at the processing unit 150, generating an output tensor partition of a first output tensor based on the first input tensor and the weight tensor partition in Block S140. The method S100 further includes storing, in the shared memory unit 140: a second weight tensor at a third source address; a second input tensor at a fourth source address, the second input tensor: including a set of input tensor partitions; and smaller than the second weight tensor in Block S150. The method S100 further includes broadcasting the second weight tensor from the third source address to a second relative destination address in the set of primary memory units 120 in Block S160. The method S100 further includes, for each processing unit 150 in the set of processing units 150: transferring an input tensor partition in the set of input tensor partitions from the fourth source address to a second destination address in the primary memory unit 120 of the processing unit 150 in Block S170; and, at each processing unit 150 in the set of processing units 150, generating an output tensor partition of a second output tensor based on the second weight tensor and the input tensor partition in Block S180.

3. Applications

Generally, a multicore processor system (hereinafter "processor system 100") can simultaneously broadcast data read from a shared memory unit 140 (i.e., L2 memory) of the processor system 100 to multiple primary memory units 120, each corresponding to one processing unit 150 (i.e., processor core) of the processing system, thereby increasing the memory transfer bandwidth, reducing processing time, and reducing power consumption of the processor system 100 during execution of a scheduled parallel process—such as evaluation of a convolutional neural network (hereinafter "CNN"). More specifically, the processor system 100 includes: a broadcast subsystem 130 configured to concurrently transfer data from the shared memory unit 140 to the primary memory units 120 of the processor system 100, thereby decreasing the rate of read/write requests executed at the shared memory unit 140 for a given amount of memory transferred; and a memory management subsystem configured to leverage the resultant decrease in read/write requests at the shared memory unit 140 to reduce power consumption of the shared memory unit 140 by selectively transitioning inactive memory modules of the shared memory unit 140 to a low-power state. Thus, the processor system 100 can quickly and efficiently execute complex parallel processes in edge computing, low-power, or offline applications in which cloud-based resources may not be available or practical.

Additionally, the processor system 100 includes a direct memory access core 110 (hereinafter "DMA core 110") configured to receive a set of control signals (e.g., from a control processor or queue processor) specifying data transfer operations to and from the shared memory unit 140 and the primary memory units 120 of the processor system 100. Therefore, the DMA core 110 issues read requests or write requests (i.e., data transfer requests) indicating source addresses and destination addresses respectively in order to initiate transfers or broadcasts between the shared memory unit 140 and the set of primary memory units 120. Thus, the DMA core 110 can retrieve target data from the shared memory unit 140 (e.g., into a local data buffer 112 within the DMA core no) and direct these target data to the broadcast subsystem 130 for distribution to the indicated destination address or addresses in the set of primary memory units 120.

In order to transfer target data from the shared memory unit 140 to multiple primary memory units 120 simultaneously, the broadcast subsystem 130 includes a broadcast-enabled interconnect (e.g., one or more broadcast buses 132, a crossbar interconnect, or a network-on-chip) that connects to an exclusive set of the primary memory units 120 of the processor system 100. The broadcast-enabled interconnect can operate in two data transfer modes: unicast (i.e., transfer target data to a single primary memory unit 120 to which the interconnect is connected) or multicast (i.e., transfer target data to all of the primary memory units 120 to which the interconnect is connected). In one example, the processor system 100 includes eight processing units 150 with corresponding primary memory units 120 and the broadcast subsystem 130 includes two broadcast buses 132 acting as the broadcast-enabled interconnect, each broadcast bus 132 connected to four of the primary memory units 120. In this example, the processor system 100 can: multicast target data via both broadcast buses 132; multicast via a first broadcast bus 132 and unicast via a second broadcast bus 132; or unicast via both broadcast buses 132. Additionally, the processor system 100 can: transfer the same set of target data via both broadcast buses 132; or transfer a different set of target data via each broadcast bus 132. Therefore, by combining the above-described transferring options, the processor system 100, can: transfer a single set of target data to one, two, four, five, or eight primary memory units 120 simultaneously; or simultaneously transfer two different sets of target data such that each set of target data is transferred to a separate primary memory unit 120, each set of target data is transferred to a separate group of four primary memory units 120, or one set of target data is transferred to a single primary memory unit 120 and the other set of target data is transferred to a separate group of four primary memory units 120. By facilitating this flexibility, the broadcast subsystem 130 reduces idling time of the processing units 150 incurred due to serial transfers and enables tight synchronization of output-stationary parallel processes executing across the set of processing units 150. However, because the broadcast subsystem 130 can include as few as two broadcast buses 132, the broadcast system maintains a small on-silicon spatial footprint.

As a result of the increase in data transfer bandwidth between the shared memory unit 140 and the primary memory units 120 enabled by the broadcast subsystem 130, the processor system 100 can issue fewer read/write requests to the shared memory unit 140 per unit of memory transferred, thereby resulting in greater downtime for the memory modules of the shared memory unit 140. The memory management subsystem can leverage this increased downtime to reduce the power consumption of the shared memory unit 140 via: a shared memory unit 140 that is partitioned into discrete memory modules; a conflict resolution scheduler configured to analyze a queue of data transfer requests to the shared memory unit 140, to detect collisions in this shared memory unit queue, and to reorder or pause requests in order to resolve these collisions; and a power management unit configured to track an idle factor of each memory module and selectively switch memory modules into sleep mode based on the idle factor of each memory module. In one implementation, the conflict resolution scheduler and the power management unit are hardware-implemented finite state machines or microprocessors embedded within the processor system 100.

In one application, the processor system 100 can reduce power consumption and inference time of a statically-scheduled CNN executed on the processor system 100 according to the method S100. In this application, the statically-scheduled CNN is characterized by an output-stationary dataflow. However, while operating according to an output-stationary dataflow defined by the static schedule of the CNN, the processor system 100 can either broadcast the input tensor of each layer and unicast multiple partitions of the weight tensor of each layer (i.e., input-broadcast dataflow) or the processor system 100 can broadcast the weight tensor of each layer and unicast multiple partitions of the input tensor of each layer (i.e., weight-broadcast dataflow). Therefore, prior to execution of the CNN by the processor system 100, a cooperating scheduling application can identify a first subset of layers within the CNN that are more efficiently executed according to the input-broadcast dataflow, and identify a second subset of layers within the CNN that are more efficiently executed by the weight-broadcast dataflow, to generate a hybrid-dataflow schedule including both input-broadcast layers and weight-broadcast layers in a single static schedule for the CNN. Thus, the processor system 100 can leverage its greater data-parallelism, low power consumption, and small on-silicon footprint in combination with a hybrid-dataflow schedule in order to rapidly execute statically scheduled CNN in an edge-computing environment.

4. Processor System

Generally, as shown in FIG. 1, the processor system 100 is a multi-core processor circuit including: a set of processing units 150; a set of memory components in a memory hierarchy—such as main memory, a shared memory unit 140 (i.e., L2 memory), a set of primary memory units 120 (i.e., L1 memory) for each processing unit 150 in the processor system 100—a DMA core 110, a control processor (such as the queue processor described in U.S. patent application Ser. No. 17/211,707), a broadcast subsystem 130, and a memory management subsystem. The processor system 100 can be configured to execute statically- or dynamically-scheduled parallel processes, such as inference generation via a statically-scheduled CNN.

The processor system 100 includes a set of interconnects, address interconnects, control lines, interrupt lines, and hardware-implemented queues connecting each of these components to enable communication of data between the control processor and the DMA core 110, between the DMA core 110 and the shared memory unit 140, between the DMA core 110 and the set of primary memory units 120, and/or between the DMA core 110 and the main memory. Thus, the processor system 100 includes a DMA core 110 that receives control signals specifying data transfers and/or data broadcasts from the shared memory unit 140 to the set of primary memory units 120. The processor system 100 can also include a control interconnect between the control processor and the set of processing units 150 in order to issue instructions to these processing units 150.

4.1 DMA Core:

Generally, the DMA core 110 is configured to: receive control signals from a control processor, each control signal indicating a data transfer operation between memory components of the processor system 100; and to issue corresponding data transfer requests (e.g., read requests or write requests) to the indicated memory components. For example, the DMA core 110 can receive a data transfer operation specifying a data transfer from the shared memory unit 140 to the set of primary memory units 120. In this example, the DMA core 110 can issue a read request to the memory management subsystem, which then forwards the read request to the shared memory unit 140. The shared memory unit 140 can then respond to the read request by transferring the request target data to a data buffer 112 within the DMA core 110. The DMA core 11o can, in response to receiving the target data in the data buffer 112, issue a write request for the target data to the broadcast subsystem 130 to initiate transfer of the target data to one or more primary memory units 120 in the set of primary memory units 120. Thus, the DMA core 110 coordinates efficient data transfer between memory components of the processor system 100.

More specifically, in order to transfer data between memory components, the DMA core 110 can: issue a read request to a source memory component specifying a source memory address of the target data; store the target data in an internal data buffer 112; issue a write request to one or more destination memory components specifying a destination memory address or relative destination memory address (for broadcast operations); and enable access to these target data in the internal data buffer 112 by the broadcast subsystem 130 (for writes to the set of primary memory units 120) or by the memory management subsystem (for writes to the shared memory unit 140). When executing a broadcast operation, the DMA core no can issue a write request indicating a relative destination memory address, which indicates a single memory address for the broadcast operation. In one implementation, because each primary memory unit 120 in the set of primary memory units 120 defines the same memory addresses, the broadcast subsystem 130 can write the target data from the DMA core no to the same location within each primary memory unit 120 specified in the write request. In one example, the DMA core no can issue write requests to the set of primary memory units 120 specifying a single memory address and a set of primary memory unit 120 identifiers specifying the primary memory units 120 for which the write request is intended. The broadcast subsystem 130 can then: receive this write request; and identify the broadcast buses 132 and data transfer mode for these interconnects with which to transfer the target data to the destination address in the correct primary memory units 120.

In one implementation, the processor system 100 includes a set of multiple in-line DMA engines (i.e., DMA contexts) operating as the DMA core no in order to concurrently handle multiple transfer instructions. Thus, the DMA core no can simultaneously issue transfer requests between the same pair of data components and support the increased data bandwidth enabled by the broadcasting subsystem and the memory management subsystem. In one example, the DMA core no includes eight DMA engines: a first set of four DMA engines dedicated to transferring data between the shared memory unit 140 and the set of primary memory units 120; and a second set of four DMA engines dedicated to transferring data between the main memory and the shared memory unit 140. In another example, the DMA core 110 does not include DMA engines configured to transfer data directly between the main memory and the set of primary memory units 120.

In another implementation, the processor system 100 includes a DMA core 110 such as the tensor traversal engine described in U.S. patent application Ser. No. 17/331,585 and U.S. patent application Ser. No. 17/331,590, which are incorporated by reference in their entireties. More specifically, the processor system 100 can include a DMA core 110 including a set of tensor traversal engines configured to issue data transfer requests specifying multi-dimensional data transfer operations. In this implementation, each tensor traversal engine can execute strided data transfer operations across multiple dimensions (e.g., according to a data access pattern) and execute in-line data decompression, data expansion, or data transpose. Thus, in implementations in which the processor system 100 includes a set of tensor traversal engines as the DMA core 110, the processor system 100 can leverage these multidimensional data transfer operations to improve memory management and broadcasting at either the memory management subsystem or the broadcast subsystem 130.

4.2 Processing Units and Primary Memory Units

Generally, the processor system 100 includes a set of processing units 150 configured to execute computational steps on data transferred to the set of primary memory units 120 in order to execute the scheduled parallel process. More specifically, the processor system 100 includes a set of processing units 150, each processing unit 150 corresponding to a single primary memory unit 120 from which the processing unit 150 can read input data and write output data. Thus, by transferring data to a primary memory unit 120 corresponding to a processing unit 150, the processor system 100 can make accessible inputs necessary to compute outputs or intermediate data for the scheduled parallel process.

In one implementation, the processor system 100 includes a set of heterogeneous processing units 150, which execute specific computational tasks. For example, the processor system 100 can issue control signals to CPUs, GPUs, or specialized deep learning processors (hereinafter "DLPs") that are included in the multicore processor system 100.

In another implementation, the processor system 100 includes a set of processing units 150 configured specifically for edge execution of CNNs or other deep artificial neural networks, which are described in further detail in U.S. Pat. No. 10,474,464. In one example, the processor system 100 includes eight DLPs as the set of processing units 150, each DLP corresponding to a single primary memory unit 120.

The control processor interfaces with this set of processing units 150 via the control interconnect and can send and receive control signals from each processing unit 150. Thus, the control processor can: dispatch instructions to each processing unit 150; register when each instruction has been executed by the processing units 150; and track the execution order to instructions.

4.2 Broadcast Subsystem

Generally, the broadcast subsystem 130 includes a set of hardware components at the interface between the DMA core 110 and the set of primary memory units 120 in order to simultaneously broadcast data read from the shared memory unit 140 to multiple primary memory units 120. More specifically, the broadcast subsystem 130 includes: a primary memory unit queue 134, a broadcast scheduler 136, and a set of broadcast buses 132 acting as a broadcast-enabled interconnect. Thus, the broadcast system modifies the functionality of the processor system 100 to support broadcasting operations between the shared memory unit 140 of the processor system 100 and the primary memory units 120 of the processor system 100. Individual components of the broadcast system are further described below.

4.3.1 Primary Memory Unit Queue

Generally, the primary memory unit queue 134 is a hardware implemented queue tracking read requests and write requests made to the primary memory units 120 from the DMA core 110 and buffering these sequential data transfer operations. More specifically, the primary memory unit queue 134 is a first-in-first-out queue (hereinafter "FIFO queue") electrically coupled to the DMA core 110 and to the set of broadcast buses 132. Each element of the primary memory unit queue 134 stores a data transfer request from the DMA core 110 including read requests or write requests. Thus, the primary memory unit queue 134 functions as a request buffer for the set of primary memory units 120 corresponding to the set of processing units 150.

In one implementation, the processor system 100 includes a primary memory unit queue 134 that defines a subqueue corresponding to each primary memory unit 120. More specifically, the processor system 100 can include a primary memory unit queue 134 including a set of primary memory unit 120 subqueues, each primary memory unit 120 subqueue in the set of primary memory unit 120 subqueues corresponding to a primary memory unit 120 in the set of primary memory units 120. In this implementation, the broadcast scheduler 136 can aggregate like write requests (i.e., write request for the same target data) to multiple primary memory units 120 into a single broadcast operation, thereby reducing overhead at the DMA core 110 (e.g., by enabling the DMA core 110 to issue serial write requests, which the broadcast subsystem 130 can aggregate into a broadcast or multicast operation). Thus, upon issuing a transfer request for a first primary memory unit 120, the processor system 100 can populate a subqueue of the primary memory unit queue 134 corresponding to the first primary memory unit 120 with the request.

In another implementation, the processor system 100 includes a primary memory unit queue 134 that defines a single subqueue and a DMA core 110 configured to issue write requests that include a set of primary memory unit 120 identifiers indicating a subset of target primary memory units 120 in the set of primary memory units 120 to receive the data corresponding to the write request. In this implementation, the broadcast scheduler 136 can utilize a logic table to schedule unicast, multicast, and/or broadcast operations based on the subset of target primary memory unit 120 indicated by write requests in the primary memory unit queue 134, as is further described below.

In yet another implementation, the processor system 100 includes a primary memory unit queue 134 that defines a subqueue for each broadcast bus 132 of the broadcast system. More specifically, the primary memory unit queue 134 can include a primary memory unit queue 134 including a set of broadcast bus 132 subqueues, each broadcast bus 132 subqueue in the set of broadcast bus 132 subqueues corresponding to a broadcast bus 132 in the set of broadcast buses 132. For example, in an implementation in which the broadcast system includes two broadcast buses 132, the primary memory unit queue 134 can include two subqueues. In this implementation, the processor system 100 includes a DMA core 110 configured to issue write requests indicating a unicast transfer operation or a multicast transfer operation for the broadcast bus 132. Additionally or alternatively, the processor system 100 can include a DMA core 110 configured to issue write requests to subqueue corresponding to a broadcast bus 132 such that each write request specifies a subset of primary memory units 120 in a set of primary memory units 120 corresponding to the broadcast bus 132 of the subqueue.

4.3.2 Broadcast-Enabled Interconnects

Generally, the broadcast subsystem 130 includes a set of broadcast buses 132 acting as a broadcast-enabled interconnect configured to transfer data in parallel to multiple primary memory units 120 in the set of primary memory units 120. More specifically, the broadcast subsystem 130 includes a set of broadcast buses 132 where each broadcast bus 132 is connected to an exclusive subset of the primary memory units 120 and is configured to operate two data transfer modes: unicast mode and multicast mode. In particular, each broadcast bus 132 in the set of broadcast buses 132 is configured to operate according to either of a set of data transfer modes including: a unicast mode for transferring the source data to one primary memory unit 120 in the subset of primary memory units 120; and a multicast mode for transferring the source data to each primary memory unit 120 in the subset of primary memory units 120. Thus, the processor system 100 can transfer data from the shared memory unit 140 to multiple primary memory units 120 simultaneously or can execute multiple serial data transfer operations in parallel using separate broadcast buses 132.

Figure 3:
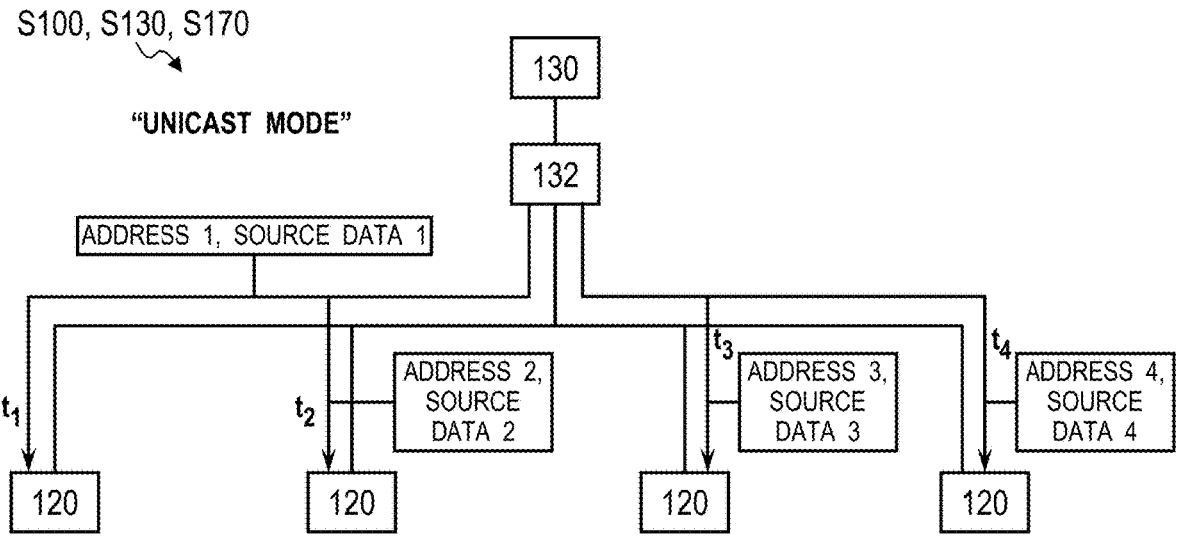
FIG. 3 is a flowchart representation of one variation of the method.
Figure 4:
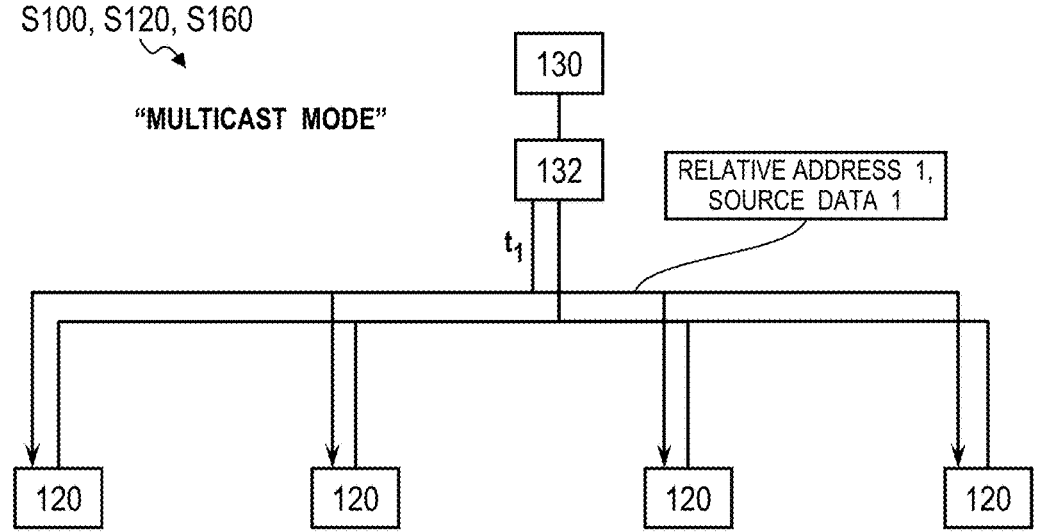
FIG. 4 is a flowchart representation of one variation of the method.

As shown in FIG. 3, when operating in unicast mode, a broadcast bus 132 transfers data to one target primary memory unit 120 to which it is connected based on the target primary memory unit 120 indicated in the relevant write request (stored in the primary memory unit queue 134) and transfers data to the destination address indicated in the relevant write request. As shown in FIG. 4, when operating in multicast mode, a broadcast bus 132 transfers data to all primary memory units 120 to which it is connected and transfers data to the same relative destination address on each of the primary memory units 120 to which it is connected.

In one implementation, the broadcast subsystem 130 includes two broadcast buses 132, each connected to four processing units 150 for a total of eight processing units 150. More specifically, the broadcast subsystem 130 can include a set of broadcast buses 132 including: a first broadcast bus 132 electrically coupled to a first subset of primary memory units 120 in the set of primary memory units 120; and a second broadcast bus 132 electrically coupled to a second subset of primary memory units 120 in the set of primary memory units 120. In this implementation, the broadcast subsystem 130 can maintain a small on-silicon footprint (when compared to a broadcast subsystem 130 including four or eight broadcast buses 132) while still enabling much greater parallelization (e.g., two simultaneous serial data streams via each broadcast bus 132) than a single broadcast bus 132 connected to all eight processing units 150. In one example of this implementation, the first subset of primary memory units 120 can include a first set of four primary memory units 120 and the second set of primary memory units 120 can include a second set of four primary memory units 120. This example implementation enables broadcast functionality for a full set of eight processing units 150 while also maintaining flexibility to unicast within two sets of four processor units in parallel.

Additionally or alternatively, the broadcast subsystem 130 can include a set of broadcast buses 132 (e.g., a pair of broadcast buses 132) arranged with or connected to each separate group of four primary memory units 120. In this alternative variation of the example implementation, the broadcast subsystem 130 can simultaneously or substantially simultaneously execute more than one broadcast operation to the separate group of four primary memory units 120.

4.3.3 Broadcast Scheduler

Generally, the broadcast scheduler 136 acts as an interface between the primary memory unit queue 134 and the set of broadcast buses 132. In particular the broadcast scheduler 136 can access the primary memory unit queue 134 and reads the earliest (i.e., first-in) data transfer request or earliest set of data transfer requests in the primary memory unit queue 134 in order to coordinate the data transfer operation requested the data transfer request(s) via the set of broadcast buses 132. More specifically, the broadcast scheduler 136 is configured to: for a first-in data transfer request, or earliest subset of data transfer requests, in the set of data transfer requests stored in the primary memory unit queue 134, select a subset of broadcast buses 132 in the set of broadcast buses 132 to transfer the source data to the target subset of primary memory units 120 according to the first-in data transfer request; and select a data transfer mode (e.g., unicast or multicast) for each broadcast bus 132 in the subset of broadcast buses 132. The processor system 100 can then broadcast target data from the data transfer operation via the selected broadcast buses 132 and to write these target data to the target subset of primary memory units 120.

The broadcast scheduler 136 can be a hardware-implemented finite state machine or microprocessor embedded within the processor system 100 configured to read data transfer requests in the primary memory unit queue 134. In one implementation, the broadcast scheduler 136 is configured to reorder data transfer requests within the primary memory unit queue 134 to more efficiently aggregate like requests within the primary memory unit queue 134 for transfer via a broadcast or multicast operation. For example, the broadcast scheduler can identify a set of like transfer requests in the primary memory unit queue 134; reorder the primary memory unit queue 134 such that the set of like transfer requests are consecutive with the primary memory unit queue 134; and execute the set of like transfer requests as a broadcast or multicast operation to a target set of primary memory units 120.

Figure 5:
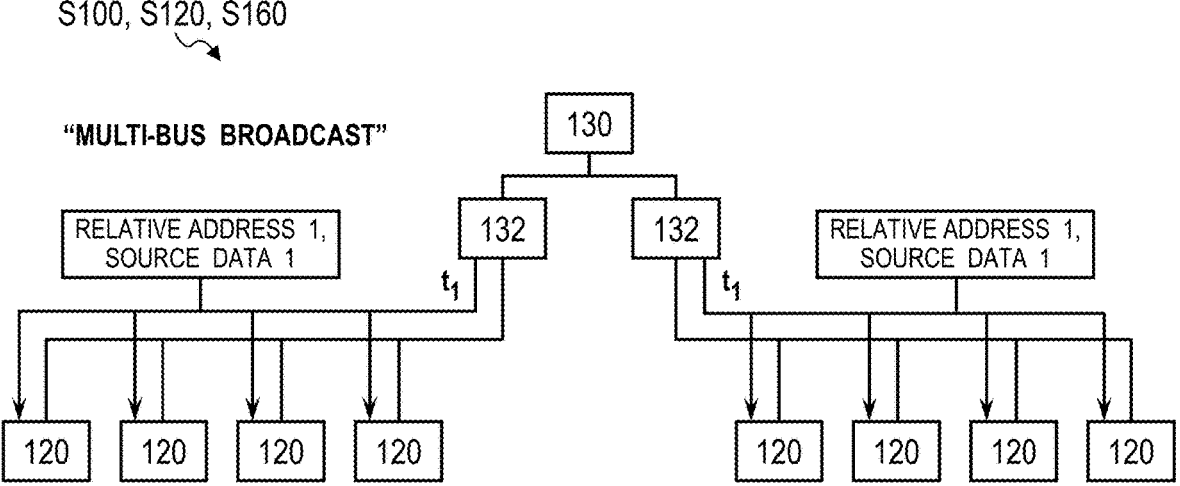
FIG. 5 is a flowchart representation of one variation of the method.
Figure 6:
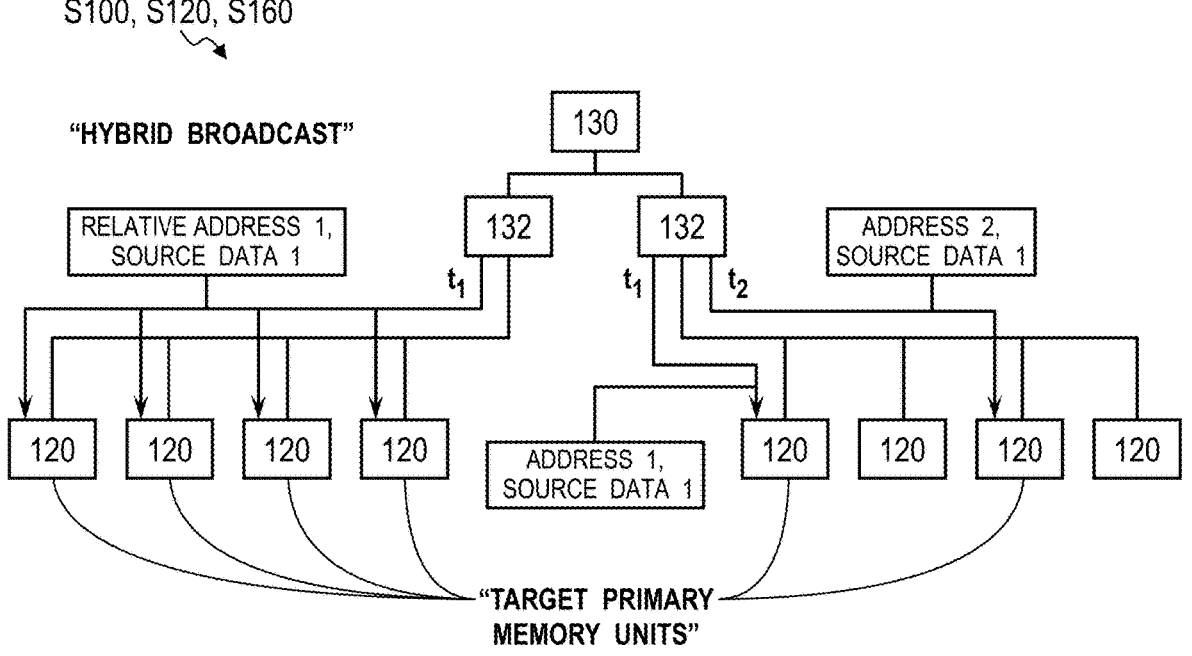
FIG. 6 is a flowchart representation of one variation of the method.

In one implementation in which the write requests stored in the primary memory unit queue 134 identify a target set of primary memory units 120 for a data transfer operation, the broadcast scheduler 136 can utilize a look-up table or integrated logic circuit to select the subset of broadcast buses 132 and the data transfer mode of these broadcast buses 132. In one example in which the processor system 100 includes eight primary memory units 120, a first broadcast bus 132 connected to a first set of four primary memory units 120 (memory units zero, one, two, and three), and a second broadcast bus 132 connected to a second set of four primary memory units 120 (memory units four, five, six, and seven), the broadcast scheduler 136 can: access a write request targeting memory units zero and five; select the first broadcast bus 132 and the second broadcast bus 132; and select the unicast transfer mode for both broadcast buses 132. In another instance, in this example, the broadcast scheduler 136 can: access a write request targeting memory units zero, one, two, and three; select the first interconnect; and select the multicast transfer mode for the first broadcast bus 132. In yet another instance, as shown in FIG. 5, the broadcast scheduler 136 can: access a write request targeting all memory units; select both broadcast buses 132; and select the multicast transfer mode for both broadcast buses 132. In yet another instance, as shown in FIG. 6, the broadcast scheduler 136 can: access a write request targeting memory units zero and one; detect that this write is incompatible with the broadcast bus 132 structure; and serialize these requests as a first write request to memory unit one and a second write request to memory unit two.

Thus, the broadcast scheduler 136 can utilize the structure of the primary memory unit queue 134 and the content of write requests with the primary memory unit queue 134 in order to select a set of broadcast buses 132 and to select data transfer modes for the selected set of broadcast buses 132 in order to coordinate a broadcast operation. More specifically, the processor system 100 can include a broadcast scheduler 136 configured to: select a combination of broadcast buses 132 from a set of combinations of broadcast buses 132 based on the target subset of primary memory units 120, the set of combinations of broadcast buses 132 including the first broadcast bus 132, the second broadcast bus 132, and both the first broadcast bus 132 and the second broadcast bus 132; and transfer the source data to the target subset of primary memory units 120 via the selected combination of broadcast buses 132. Additionally, the broadcast scheduler 136 can select a multicast operation or a unicast operation for each broadcast bus 132 in the selected combination of broadcast buses 132. More specifically, the processor system 100 can include a broadcast scheduler 136 configured to, for each broadcast bus 132 in the subset of broadcast buses 132 and for the first-in data transfer request in the primary memory unit queue 134: select a selected data transfer mode in the set of data transfer modes (i.e., unicast or multicast mode) based on the first-in data transfer request in the primary memory unit queue 134; and transfer the source data to the target subset of primary memory units 120 according to the selected data transfer mode.

In implementations in which the primary memory unit queue 134 includes a set of primary memory unit 120 subqueues as described above, the broadcast scheduler 136 can identify a set of like data transfer requests in the first-in or set of first-in positions within each primary memory unit 120 subqueue in order to identify an efficient broadcast operation with which to accomplish the set of like transfer requests. More specifically, the process system can include a broadcast scheduler 136 configured to: identify a set of associated data transfer requests in the set of data transfer operations spanning the set of primary memory unit 120 subqueues, the set of associated data transfer requests characterized by common source data; identify the target subset of primary memory units 120 based on the set of associated data transfer requests; and select a subset of broadcast buses 132 in the set of broadcast buses 132 to transfer the common source data to the target subset of primary memory units 120 based on the target subset of primary memory units 120; and configured to transfer the common source data to the target subset of primary memory units 120 via the subset of broadcast buses 132. Thus, the broadcast scheduler 136 can aggregate multiple data transfer requests across subqueues into a single broadcast or multicast operation.

In implementations in which the broadcast bus 132 is implemented as a network-on-chip, the broadcast scheduler 136 can route write requests directly from the DMA core 110 to the broadcast bus 132. The broadcast bus 132 can then broadcast data corresponding to these write requests via internal routers included in the network-on-chip.

4.4 Flow Control

Generally, the processor system 100 can include a flow control subsystem to reduce buffer allocation at the primary memory unit 120. However, because the processor system 100 includes a broadcast subsystem 130, bottlenecks at a single primary memory unit 120 can prevent efficient data transfer to other primary memory units 120 via the broadcast subsystem 130. Thus, the processor can include a flow control system specifically designed to prevent these bottlenecks at individual primary memory units 120 and evenly allocated data among the set of primary memory units 120 and corresponding processing units 150.

In one implementation, the processor system 100 includes a credit-based flow control subsystem. In this implementation, the broadcast subsystem 130 can maintain a number of credits corresponding to each primary memory unit 120 in the set of primary memory units 120. The credit-based flow control system can update the number of credits corresponding to each primary memory unit 120 based on the amount of space available in the primary memory unit 120. In this implementation, the broadcast scheduler 136 can then execute unicast write operations to the primary memory unit 120 for which the greatest number of credits are available. Given the output-stationary scheduling scheme for the scheduled parallel process, which is further described below, and assuming homogenous processing units 150 in the set of processing units 150, the broadcast scheduler 136 can allocate unicast operations to any primary memory unit 120. If the broadcast scheduler 136 allocates multiple partitions within a layer to a single primary memory unit 120, the processing unit 150 corresponding to the primary memory unit 120 can generate output partitions for each input or weight partition allocated to the primary memory unit 120 in series. Additionally, in implementations in which the broadcast scheduler 136 is implemented as a microprocessor, the broadcast scheduler 136 can track the primary memory unit 120 to which each input or weight partition has been allocated and can issue read requests to the same primary memory unit 120 to retrieve a resulting output partition. Thus, the credit-based flow control system can dynamically reallocate unicast operations within a layer or stage of the scheduled parallel process in order to ensure that each primary memory unit 120 in the set of primary memory units 120 includes available space for subsequent broadcast or multicast operations of the scheduled parallel process. Additionally or alternatively, the credit-based flow control system can include a set of reserved credits allocated for broadcast operations over the bus thereby ensuring that the broadcast scheduler 136 can schedule broadcast operations during and/or intermittently between unicast operations.

In another implementation, the processor system 100 can include a handshake-based flow control subsystem. In this implementation, the handshake-based flow control subsystem can issue a binary status indicator indicating whether each primary memory unit 120 in the set of primary memory units 120 can receive additional data. In response to the handshake-based flow control subsystem indicating that a subset of the primary memory units 120 cannot receive data, the broadcast scheduler 136 can halt broadcasts until each of the primary memory units 120 are again able to receive data (as indicated by the handshake-based flow control subsystem). Additionally or alternatively, the broadcast system can instead divide a multicast or broadcast operation in the primary memory unit queue 134 into a set of unicast operations, in response to one or more primary memory units 120 being unable to receive data according to the handshake-based flow control subsystem for greater than a threshold number of cycles.

4.5 Shared Memory Unit

Generally, the processor system 100 includes a shared memory unit 140 partitioned into a set of memory modules enabling multichannel read, multichannel write, and independent power mode control of these memory modules. More specifically, the shared memory unit 140 is implemented as multiple RAM memory modules accessible via a multichannel interface. Additionally, the shared memory unit 140 includes a set of data transfer ports including a set of read ports, a set of write ports, and/or a set read/write ports. Thus, the shared memory unit 140 can execute multiple simultaneous read/write requests issued by the DMA core 110 while maintaining low levels of power consumption.

In one implementation, the processor system 100 can include a four-megabyte shared memory unit 140 divided into 64 memory modules. Each memory module is individually addressable via a simultaneous read/write port. Each memory module is also connected to the power management unit to enable power mode control of individual memory modules via the power management unit. Additionally, each memory module can report read and write activity to the power management unit such that the power management unit can track the idle factor of each memory module of the shared memory unit 140.

In another implementation, the processor system 100 can include a multichannel shared memory unit 140 interface enabling parallel reads and writes to the shared memory unit 140. In one example, the shared memory unit 140 can include a three-channel read/write interface enabling the processor system 100 to read from three independent memory modules simultaneously and write to three independent memory modules simultaneously. Thus, the processor system 100 can read data from and write data to up to six memory modules simultaneously.

In yet another implementation, each channel at the shared memory unit 140 interface is assigned to DMA engines in the DMA core 110 dedicated to transferring data between the shared memory unit 140 and the set of primary memory units 120 or DMA engines dedicated to transferring data between the shared memory unit 140 and the main memory. In one example, the shared memory unit 140 includes a greater number of channels assigned to transfer data between the shared memory unit 140 and the set of primary memory units 120 (e.g., two channels dedicated to the set of primary memory units 120 and one channel dedicated to the main memory).

4.6 Memory Management Subsystem

Generally, the memory management subsystem includes a set of hardware components at the interface between the DMA core 110 and the shared memory unit 140. More specifically, the memory management subsystem, includes a shared memory unit queue configured to store a second set of data transfer requests associated with the shared memory unit 140, a conflict resolution scheduler, and a power management unit configured to, for each memory module in the set of memory modules, switch the memory module to sleep mode in response to detecting an idle factor of the memory module greater than a threshold idle factor. Thus, the memory management subsystem increases data transfer bandwidth between the shared memory unit 140 and the DMA core 110 and therefore increases the rate of data transfer between the shared memory unit 140 and the set of primary memory units 120 (e.g., via the DMA core 110) without increasing the power consumption of the shared memory unit 140. Additionally, the memory management subsystem also prevents read/write collisions (e.g., due to simultaneous reads or writes to the same memory module) despite the increase in read/write requests handled by the shared memory unit 140.

4.6.1 Shared Memory Unit Queue

Generally, the shared memory unit queue is a hardware implemented queue tracking read requests and write requests made to the shared memory unit 140 by the DMA core 110. More specifically, the shared memory unit queue is a queue electrically coupled to the DMA core 110 including a subqueue for each request channel at the shared memory unit 140 interface. Thus, the shared memory unit queue functions as a request buffer for the shared memory unit 140.

In one implementation, the shared memory unit queue is a FIFO queue including subqueues for each interface channel of the shared memory unit 140. For example, in an implementation in which the shared queue includes three read/write interface channels, the shared memory unit queue can include six subqueues, each corresponding to a read or write of one of the interface channels.

In another implementation, the shared memory unit queue is implemented as a reorder buffer, which can be reordered by the conflict resolution scheduler in order to prevent read or write conflicts from occurring with the shared memory unit 140.

4.6.2 Conflict Resolution Scheduler

Generally, the conflict resolution scheduler is a multiple-read multiple-write scheduler that can access a set of earliest entries in the shared memory unit queue (to be executed in parallel via the shared memory unit 140 interface channels) in order to detect potential conflicts amongst these entries prior to issuing corresponding requests to the shared memory unit 140. More specifically, the conflict resolution scheduler can be a hardware-implemented finite state machine or microprocessor configured to detect conflicting read or write requests in the shared memory unit queue. In particular, the conflict resolution scheduler can be configured to prevent simultaneous access to a memory module in the set of memory modules via the set of data transfer ports.

Thus, despite the increase in the rate of parallel read and write requests issued by the processor system 100 due to the increased bandwidth enabled by the broadcast subsystem 130, the conflict resolution scheduler prevents fatal read or write errors within the shared memory unit 140.

The conflict resolution scheduler detects conflicts between read or write requests within the shared memory unit queue by detecting whether two or more requests stored in the same level of the shared memory unit queue read from the same memory module in the shared memory unit 140 or write to the same memory module in the shared memory unit 140 based on the source addresses and destination address of these respective request types.

In one implementation in which the memory modules of the shared memory unit 140 include simultaneous read/write ports, the memory management subsystem can include two conflict resolution schedulers, including: a first conflict resolution scheduler for the subqueues of the shared memory unit queue corresponding to read requests; and a second conflict resolution scheduler for subqueues of the shared memory unit queue corresponding to write requests.

In one implementation in which the shared memory unit queue is implemented as a FIFO queue, the conflict resolution scheduler can: access a set of earliest entries within the shared memory unit queue; detect read or writes to the same memory module across these entries; and block issuance of these entries from all subqueues of the shared memory unit queue that read or write to this memory module. Thus, the conflict resolution scheduler can prevent conflicts between requests issued to the shared memory unit 140.

In another implementation in which the shared memory unit queue is implemented as a reorder buffer, the conflict resolution scheduler can access all entries of the shared memory unit queue and issue these entries out of order (as opposed to simply halting subqueues to prevent conflicting requests from issuing at the same time). Thus, by including a shared memory unit queue implemented as a reorder buffer, the memory management subsystem can increase utilization of the multichannel interface of the shared memory unit 140.

4.6.3 Power Management Unit

Generally, the power management unit individually monitors the activity of the set of memory modules of the shared memory unit 140 and selectively activates and deactivates these memory modules in order to reduce power consumption of the shared memory unit 140. More specifically, the power management unit can: monitor reads and writes to each memory module of the shared memory unit 140; and set the power setting to sleep mode or active mode, in response to these reads and writes occurring at each memory module. In particular, the power management unit is configured to, for each cycle of the processor system 100 and for each memory module in the set of memory modules, calculate the idle factor for the memory module based on a number of idle cycles of the memory module since a latest data transfer request to the memory module. Thus, the power management unit dynamically reduces the number of memory modules currently operating at full power based on current demands of the scheduled parallel process executed by the processor system 100.

The memory management subsystem can include a power management unit configured to: track an idle factor for each memory module in the shared memory unit 140; and, in response to detecting that the idle factor of a memory module exceeds a threshold idle factor, set the power mode of the memory module to sleep mode. In one implementation, the power management unit calculates the idle factor for each memory module based on the number of clock cycles since the latest read or write to the memory module. Thus, the power management unit can maintain counters for each memory module within the shared memory unit 140 in order to increment a value representing an idle factor of a corresponding memory module.

The power management unit can be configured during initialization of the scheduled parallel process with a predetermined threshold idle factor corresponding to the specific parallel process being executed by the processor system 100. In one implementation, the scheduling application calculates an idle factor based on a simulated distribution of access frequencies across the set of memory modules when executing the scheduled parallel process. Thus, the scheduling application can tune the threshold idle factor based on the particular scheduled parallel task.

In another implementation, the power management unit is connected directly to the DMA core 110 and can access source addresses and destination addresses for requests made to the shared memory unit 140 prior to issuance of these requests by the DMA core 110. Therefore, upon accessing these requests, the power management unit can: identify whether the memory module corresponding to the request is currently in sleep mode; and, in response to detecting that the memory module is in sleep mode, set the memory module to active mode. Thus, the power management unit can preemptively wake memory modules in sleep mode in response to accessing read and write requests directly from the DMA, thereby reducing idle time of the processor system 100 caused by waking memory modules in sleep mode (which may take up to thirty cycles).

In yet another implementation, the power control unit is connected directly to the control processor and the control processor can issue instructions to the power management unit to specifically set the power mode of individual memory modules based on a schedule. For example, in anticipation of additional accesses to the shared memory unit 140 (e.g., across additional memory modules that are currently in sleep mode), the scheduling application can include specific instructions to wake these additional memory modules and the control processor can directly issue these instructions to the power management unit.

5. Processor System Operation

As shown in FIG. 2, the processor system 100, via the set of components described above, can execute any parallel process and specifically scheduled parallel processes according to Blocks of the method S100 further described below. Additionally, the processor system 100 can cooperate with a scheduling application—such as the scheduler described in U.S. patent application Ser. No. 17/127,904—in order to fully utilize the capabilities of the processor system 100 to increase data transfer bandwidth between the shared memory unit 140 and the set of primary memory units 120 and to reduce power consumption of the shared memory unit 140 and data transfer operations.

5.1 CNN Scheduling

Generally, the processor system 100 described above is configured to execute a scheduled parallel process that capitalizes on the broadcasting capabilities of the processor system 100. According to the method S100, the processor system 100 executes a statically scheduled CNN by: computing a first subset of layers of the CNN according to an input-broadcast output-stationary dataflow in Blocks S110, S120, S130, and S140; and computing a second subset of layers of the CNN according to a weight-broadcast output-stationary dataflow in Blocks S150, S160, S170, S180. Prior to execution of the method S100 by the processor system 100, the scheduling application can, for each layer of the CNN: calculate whether the input-broadcast dataflow or the weight-broadcast dataflow is more efficient for the layer; and schedule the data transfer operations corresponding to the calculated dataflow based on properties of the layer. Thus, the processor system 100 leverages the scheduling process of the scheduling application and the broadcast capabilities of its hardware in order to execute CNNs with low inference time and power consumption.

In one implementation, the scheduling application can evaluate each layer of the CNN based on an heuristic such as the relative size of the layer's input tensor and the layer's weight tensor. For example, the scheduling application can calculate a difference between the size of the input tensor and the size of the weight tensor for each layer and categorize the layer as either an input-broadcast layer or a weight broadcast layer based on the difference. In another example, the scheduling application can: categorize a first layer as an input-broadcast layer in response to detecting that a size of the input tensor of the layer exceeds a size of the weight tensor of the layer; and categorize a second layer as a weight-broadcast layer in response to detecting that a size of the weight tensor of the layer exceeds a size of the input tensor of the layer.

In another implementation, the scheduling application can, for each layer: simulate (e.g., via a virtualized version of the processor system 100) execution of the layer according to an input-broadcast dataflow and according to a weight-broadcast dataflow; and select a data flow for the layer based on a predetermined objective, such as minimizing inference time or minimizing power consumption. Thus, the scheduling application can estimate accurate processing time and power consumption for each type of dataflow based on properties of the processor system 100 and the specific CNN to be executed on the processor system 100 and select a data flow for each layer of the CNN according to the predetermined objective and the results of the simulation.

6. Layer Storage

Generally, the processor system 100 can store a layer of an artificial neural network (e.g., such as a CNN), including an input tensor and a weight tensor, in response to a set of scheduled transfer operations between the main memory of the processor system 100 and the shared memory unit 140 of the processor. The processor system 100 can store an input tensor and a set of weight tensor partitions for an input-broadcast output-stationary dataflow or the processor system 100 can store a weight tensor and a set of input tensor partitions for a weight-broadcast output-stationary dataflow. More specifically, the processor system 100 can store, in the shared memory unit 140: a first weight tensor at a first source address, the first weight tensor comprising a set of weight tensor partitions; and a first input tensor at a second source address, the first input tensor larger than the first weight tensor in Block Silo. Additionally, in Block S150, the processor system 100 can store, in the shared memory unit 140: a second weight tensor at a third source address; a second input tensor at a fourth source address, the second input tensor: including a set of input tensor partitions; and smaller than the second weight tensor. Thus, the processor system 100 can access inputs for a scheduled layer from the shared memory unit 140.

7. Broadcast Execution

Generally, the processor system 100 can execute a broadcast operation—such as in Blocks S120 and S160 of the method S100—via the broadcast subsystem 130 by dequeuing a series of instructions from the scheduled parallel process into a buffer or set of buffers in the DMA core 110. The DMA core 110 can then issue these instructions to the relevant resources within the processor system 100 in order to execute the broadcast operation on source data within the shared memory unit 140. More specifically, the processor system 100 can: issue a read request to the memory management subsystem for the source data; transfer the source data from the shared memory unit 140 into an internal data buffer 112 of the DMA core 110; issue a write request (including the source data) indicating a relative destination address (in each primary memory unit 120 in a set of target primary memory units 120) to the broadcast subsystem 130 (e.g., the primary memory unit queue 134); and, via the set of broadcast buses 132 of the processor system 100, simultaneously transfer the source data from the shared memory unit queue to the relative destination address in each primary memory unit 120 in the set of target primary memory units 120. Thus, the system can transfer source data from the shared memory unit 140 to a set of primary memory units 120 in parallel and via a single read request and a single write request.

While simultaneously transferring source data from the data buffer 112 of the DMA access core to a set of target primary memory units 120, the processor system 100 can include the source data for the broadcast operation in the write request transmitted from the DMA core 110 to the broadcast subsystem 130. Thus, the processor system 100 can transfer the source data to an intermediate buffer in the broadcast subsystem 130 prior to broadcasting this source data via the set of broadcast buses 132. Alternatively, the processor system 100 can store the source data for each data transfer request in the primary memory unit queue 134, the source data combined with the corresponding relative destination address and any other instructions, such as the data transfer mode for the data transfer operation (e.g., unicast, multicast, or broadcast), the target primary memory units 120 for the data transfer request, or the target broadcast buses 132 for the data transfer operation.

In one implementation, the processor system 100 can: issue a data transfer request to the broadcast subsystem 130 indicating a set of target primary memory units 120; and, for each broadcast bus 132 in the set of broadcast buses 132 in the broadcast subsystem 130, select a data transfer mode for the broadcast bus 132 based on the set of target primary memory units 120 indicated in the data transfer request. Thus, the processor system 100 can issue data transfer requests indicating a set of target primary memory units 120 and select a set of broadcast buses 132 and corresponding data transfer modes to satisfy the data transfer request.

In another implementation, the processor system 100 can: issue a data transfer request to the broadcast subsystem 130 indicating a set of target broadcast buses 132 and a target data transfer mode for each target broadcast bus 132; and, for each broadcast bus 132 in the set of target broadcast buses 132, select the data transfer mode for the broadcast bus 132 based on the indicated data transfer mode. Thus, the processor system 100 can reduce overhead at the broadcast subsystem 130 by increasing the specificity of data transfer requests issued to the broadcast subsystem 130.

Generally, the method S100 includes executing input-broadcast layers and weight-broadcast layers, as scheduled by the scheduling application for an artificial neural network. Blocks of the method S100 corresponding to input-broadcast layers and Blocks of the method S100 corresponding to weight-broadcast layers are each described below.

8. Input-Broadcast Layer Execution

Generally, the processor system 100 can broadcast the first input tensor from a source address to a relative destination address in the set of primary memory units 120 in Block S120. More specifically, the processor system 100 can: issue a first read request for a first input tensor at a second source address, via a direct memory access core 110; in response to the first read request, load the first input tensor into a data buffer 112; via the direct memory access core 110, issue a first write request specifying the first relative destination address to the broadcast subsystem 130; and, via a set of broadcast buses 132 of the processor system 100, simultaneously transfer the first input tensor from the data buffer 112 to the first relative destination address in each primary memory unit 120 in the set of primary memory units 120. Thus, in Block S120, the processor system 100 broadcasts an input tensor to each of a set of primary memory units 120 in the processor system 100.

In order to compute an output for the input-broadcast layer of the artificial neural network, the processor system 100 also distributes a set of weight partitions, each partition including a subsection of the weight tensor for the input-broadcast layer. More specifically, the processor system 100 can, for each processing unit 150 in the set of processing units 150, transfer a weight tensor partition in the set of weight tensor partitions from the first source address to a first destination address in the primary memory unit 120 of the processing unit 150 in Block S130. Thus, the processor system 100 can broadcast an input tensor of a layer of an artificial neural network and serially unicast a set of weight partitions, thereby making available input data and weight partition data to each processor unit in the set of processor units.

Upon receiving both input data and weight partition data at each primary memory unit 120 in the set of target primary memory units 120, the processor system 100 can, via a set of processor units corresponding to the target set of primary memory units 120, calculate an output partition based on the input tensor and the weight partition for each primary memory unit 120 in the set of target primary memory units 120. More specifically, the processor system 100 can: at the processing unit 150, generate an output tensor partition of a first output tensor based on the first input tensor and the weight tensor partition in Block S140. Thus, by repeatedly executing Blocks S110, S120, S130, and S140 over successive layers of an artificial neural network, the processor system 100 can continually execute the scheduled parallel process.

In one implementation, the processor system 100, via the set of processor units and the corresponding set of target primary memory units 120, can generate an output tensor partition of the output tensor based on an input tensor and a weight tensor partition by executing a convolution operation based on the first input tensor and the weight tensor partition. The processor system 100, via the set of processor units, can generate the output tensor partition by executing one-dimensional convolution or two-dimensional convolution. Additionally or alternatively, the processor system 100 can execute any other tensor operations based on one or more tensors stored in the set of target primary memory units 120.

9. Weight-Broadcast Layer Execution

Generally, the processor system 100 can broadcast a weight tensor from a source address to a relative destination address in the set of primary memory units 120 in Block S160. More specifically, the processor system 100 can: issue a second read request for a second weight tensor at a third source address, via a direct memory access core 110; in response to the second read request, load the second weight tensor into a data buffer 112; via the direct memory access core 110, issue a second write request specifying the second relative destination address to the broadcast subsystem 130; and, via a set of broadcast buses 132 of the processor system 100, simultaneously transfer the second weight tensor from the data buffer 112 to the second relative destination address in each primary memory unit 120 in the set of primary memory units 120. Thus, in Block S160, the processor system 100 broadcasts a weight tensor to each of a set of primary memory units 120 in the processor system 100.

In order to compute an output for the weight-broadcast layer of the artificial neural network, the processor system 100 also distributes a set of input partitions, each input partition including a subsection of the input tensor for the weight-broadcast layer. More specifically, the processor system 100 can, for each processing unit 150 in the set of processing units 150, transfer an input tensor partition in the set of input tensor partitions from the fourth source address to a second destination address in the primary memory unit 120 of the processing unit 150 in Block S170. Thus, the processor system 100 can broadcast a weight tensor of a layer of an artificial neural network and serially unicast a set of input tensor partitions, thereby making available input data and weight partition data to each processor unit in the set of processor units for the weight-broadcast layers.

Upon receiving both input partition data and weight data at each primary memory unit 120 in the set of target primary memory units 120 the processor system 100 can, via a set of processor units corresponding to the target set of primary memory units 120, calculate an output partition based on the input tensor partition and the weight tensor for each primary memory unit 120 in the set of target primary memory units 120. More specifically, the processor system 100 can: at the processing unit 150, generate an output tensor partition of a first output tensor based on the second weight tensor and the input tensor partition in Block S180. Thus, by repeatedly executing Blocks S150, S160, S170, and S180 over successive layers of an artificial neural network, the processor system 100 can continually execute the scheduled parallel process.

As described above with respect to the input-broadcast layer execution, the processor system 100, via the set of processor units and the corresponding set of target primary memory units 120, can generate an output tensor partition of the output tensor based on a weight tensor and an input tensor partition by executing a convolution operation based on the second weight tensor and the input tensor partition. The processor system 100, via the set of processor units, can generate the output tensor partition by executing one-dimensional convolution or two-dimensional convolution. Additionally or alternatively, the processor system 100 can execute any other tensor operations based on one or more tensors stored in the set of target primary memory units 120.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
identifying a subset of data transfer requests, in a set of data transfer requests stored in a primary memory unit queue, associated with common source data;
reordering the subset of data transfer requests in the primary memory unit queue by ordering the set of data transfer requests in the primary memory unit queue into an ordered set of data transfer requests in response to identifying the subset of data transfer requests, the ordered set of data transfer requests comprising the subset of data transfer requests ordered consecutively in the ordered set of data transfer requests;
identifying a target subset of primary memory units, in a set of primary memory units, for the common source data based on the subset of data transfer requests;
selecting a combination of broadcast buses, in a set of broadcast buses, to transfer the common source data to the target subset of primary memory units, each broadcast bus in the set of broadcast buses electrically coupled to a subset of primary memory units in the set of primary memory units; and
transferring the common source data from a data buffer to the target subset of primary memory units via the combination of broadcast buses.

2. The method of claim 1:
further comprising, for each broadcast bus in the combination of broadcast buses, selecting a data transfer mode in a set of data transfer modes comprising:
a unicast data transfer mode; and
a multicast data transfer mode; and
wherein transferring the common source data comprises, for each broadcast bus in the combination of broadcast buses, transferring the common source data via the broadcast bus according to the data transfer mode.

3. The method of claim 2:
wherein selecting the data transfer mode for each broadcast bus in the combination of broadcast buses comprises selecting the multicast data transfer mode for a first broadcast bus in the combination of broadcast buses; and
wherein transferring the common source data for each broadcast bus in the combination of broadcast buses comprises transferring the common source data via the first broadcast bus according to the multicast data transfer mode.

4. The method of claim 2, wherein selecting the data transfer mode for each broadcast bus in the combination of broadcast buses comprises selecting the data transfer mode based on the target subset of primary memory units.

5. The method of claim 2, wherein selecting the data transfer mode for each broadcast bus in the combination of broadcast buses comprises selecting the data transfer mode based on a set of first-in data transfer requests, in the primary memory unit queue, comprising the subset of data transfer requests.

6. The method of claim 1:
wherein identifying the target subset of primary memory units for the common source data comprises:
identifying a first target primary memory unit, in the target subset of primary memory units, based on a first data transfer request in the subset of data transfer requests, the first target primary memory unit electrically coupled to a first broadcast bus in the combination of broadcast buses; and
identifying a second target primary memory unit, in the target subset of primary memory units, based on a second data transfer request in the subset of data transfer requests, the second target primary memory unit electrically coupled to the first broadcast bus; and
wherein transferring the common source data comprises transferring the common source data from the data buffer to the first target primary memory unit and the second primary memory unit via the first broadcast bus by executing a multicast operation for the first data transfer request and the second data transfer request.

7. A method comprising:

identifying a target subset of primary memory units, in a set of primary memory units, based on a data transfer request;

selecting a combination of broadcast buses, in a set of broadcast buses, based on the target subset of primary units, each broadcast bus in the set of broadcast buses corresponding to a subset of primary memory units in the set of primary memory units; and for each broadcast bus in the combination of broadcast buses:

based on the target subset of primary memory units, selecting a data transfer mode in a set of data transfer modes comprising:

a unicast data transfer mode; and a multicast data transfer mode; and transferring source data to a primary memory unit in the target subset of primary memory units via the broadcast bus according to the data transfer mode.

8. The method of claim 7:

wherein identifying the target subset of primary memory units comprises identifying the target subset of primary memory units based on a set of data transfer requests characterized by common source data; and wherein transferring the source data for each broadcast bus in the combination of broadcast buses comprises transferring the common source data to the primary memory unit in the target subset of primary memory units via the broadcast bus according to the data transfer mode.

9. The method of claim 8:

wherein identifying the target subset of primary memory units comprises:

identifying a first target primary memory unit, in the target subset of primary memory units, for the common source data based on a first data transfer request in the set of data transfer requests, the first target primary memory unit corresponding to a first broadcast bus in the combination of broadcast buses; and identifying a second target primary memory unit, in the target subset of primary memory units, for the common source data based on a second data transfer request in the set of data transfer requests, the second target primary memory unit corresponding to the first broadcast bus; and wherein transferring the source data comprises, for each broadcast bus in the combination of broadcast buses, transferring the common source data to the first target primary memory unit and the second primary memory unit via the first broadcast bus according to the multicast data transfer mode.

10. The method of claim 8:

wherein identifying the target subset of primary memory units comprises identifying the target subset of primary memory units for the common source data based on the set of data transfer requests comprising a set of consecutive, first-in data transfer requests in a primary memory unit queue for the set of primary memory units; and wherein transferring the common source data comprises transferring the common source data from a data buffer to the target subset of primary memory units via the combination of broadcast buses.

11. The method of claim 8:

wherein identifying the target subset of primary memory units comprises identifying the target subset of primary memory units for the common source data based on the set of data transfer requests comprising a set of first-in data transfer requests spanning a set of primary memory unit subqueues in a primary memory unit queue for the set of primary memory units, each primary memory unit subqueue, in the set of primary unit subqueues, corresponding to a primary memory unit in a set of primary memory units; and wherein transferring the common source data comprises transferring the common source data from a data buffer to the target subset of primary memory units via the combination of broadcast buses.

12. The method of claim 7:

wherein identifying the target subset of primary memory units comprises identifying the target subset of primary memory units based on a first data transfer request in a first broadcast bus subqueue for a first broadcast bus in the set of broadcast buses, the first broadcast bus subqueue comprising:

the first data transfer request indicating the unicast data transfer mode; and a second data transfer request indicating the multicast data transfer mode; and wherein transferring the source data for each broadcast bus in the combination of broadcast buses comprises transferring the source data to a first primary memory unit, in the target subset of primary memory units, via the first broadcast bus according to the unicast data transfer mode.

13. The method of claim 7:

further comprising:

identifying a subset of data transfer requests, in a set of data transfer requests stored in a primary memory unit queue for the set of primary memory units, associated with common source data; and reordering the subset of data transfer requests in the primary memory unit queue in response to identifying the subset of data transfer requests, the subset of data transfer requests consecutive in the primary memory unit queue;

wherein identifying the target subset of primary memory units comprises identifying the target subset of primary memory units for the common source data based on the subset of data transfer requests; and wherein transferring the common source data comprises transferring the common source data to the target subset of primary memory units via the combination of broadcast buses.

14. The method of claim 7:

wherein identifying the targets subset of primary memory units based on the data transfer request comprises identifying the target subset of primary memory units comprising:

a first primary memory unit corresponding to a first broadcast bus in the set of broadcast buses; and a second primary memory unit corresponding to the first broadcast bus; and wherein transferring source data for each broadcast bus in the combination of broadcast buses comprises:

transferring the source data to the first primary memory unit via the first broadcast bus by executing a first operation; and transferring the source data to the second primary memory unit via the first broadcast bus by executing a second operation.

23

15. The method of claim 14:

wherein transferring the source data to the first primary memory unit comprises transferring the source data to the first primary memory unit via the first broadcast bus according to the unicast data transfer mode; and wherein transferring the source data to the second primary memory unit comprises transferring the source data to the second primary memory unit via the first broadcast bus according to the unicast data transfer mode.

16. A method comprising:

identifying a subset of data transfer requests, in a set of data transfer requests, spanning a set of primary memory unit subqueues in a primary memory unit queue, each primary memory unit subqueue, in the set of primary unit subqueues, corresponding to a primary memory unit in a set of primary memory units, the subset of data transfer requests characterized by common source data;

identifying a target subset of primary memory units, in the set of primary memory units, for the common source data based on the subset of data transfer requests;

selecting a combination of broadcast buses, in a set of broadcast buses, to transfer the common source data to the target subset of primary memory units, each broadcast bus, in the set of broadcast buses, electrically coupled to a subset of primary memory units in the set of primary memory units;

for a first broadcast bus in the combination of broadcast buses, selecting a multicast data transfer mode in a set of data transfer modes comprising:

a unicast data transfer mode; and the multicast data transfer mode; and transferring the common source data from a data buffer to the target subset of primary memory units via the combination of broadcast buses by transferring the common source data via the first broadcast bus according to the multicast data transfer mode.

17. The method of claim 16, wherein identifying the subset of data transfer requests comprises, for each data transfer request in the set of data transfer requests, identifying the data transfer request in a first-in position of a primary memory unit subqueue in the set of primary unit subqueues.

18. A method comprising:

identifying a subset of data transfer requests, in a set of data transfer requests stored in a primary memory unit queue, associated with common source data;

reordering the subset of data transfer requests in the primary memory unit queue in response to identifying the subset of data transfer requests;

identifying a target subset of primary memory units, in a set of primary memory units, for the common source data based on the subset of data transfer requests by:

identifying a first target primary memory unit, in the target subset of primary memory units, based on a first data transfer request in the subset of data transfer requests, the first target primary memory unit electrically coupled to a first broadcast bus in the combination of broadcast buses; and identifying a second target primary memory unit, in the target subset of primary memory units, based on a second data transfer request in the subset of data transfer requests, the second target primary memory unit electrically coupled to the first broadcast bus;

selecting a combination of broadcast buses, in a set of broadcast buses, to transfer the common source data to the target subset of primary memory units, each broadcast bus in the set of broadcast buses electrically coupled to a subset of primary memory units in the set of primary memory units; and transferring the common source data from a data buffer to the target subset of primary memory units via the combination of broadcast buses by:

transferring the common source data from the data buffer to the first target primary memory unit and the second primary memory unit via the first broadcast bus by executing a multicast operation for the first data transfer request and the second data transfer request.

19. A method comprising:

identifying a target subset of primary memory units, in a set of primary memory units, based on a set of data transfer requests characterized by common source data;

selecting a combination of broadcast buses, in a set of broadcast buses, based on the target subset of primary units, each broadcast bus in the set of broadcast buses corresponding to a subset of primary memory units in the set of primary memory units; and for each broadcast bus in the combination of broadcast buses:

selecting a data transfer mode in a set of data transfer modes comprising:

a unicast data transfer mode; and a multicast data transfer mode; and transferring the common source data to a primary memory unit in the target subset of primary memory units via the broadcast bus according to the data transfer mode.

20. A method comprising:

identifying a subset of data transfer requests, in a set of data transfer requests stored in a primary memory unit queue for a set of primary memory units, associated with common source data;

reordering the subset of data transfer requests in the primary memory unit queue in response to identifying the subset of data transfer requests, the subset of data transfer requests consecutive in the primary memory unit queue;

identifying a target subset of primary memory units, in the set of primary memory units, for the common source data based on the subset of data transfer requests;

selecting a combination of broadcast buses, in a set of broadcast buses, based on the target subset of primary units, each broadcast bus in the set of broadcast buses corresponding to a subset of primary memory units in the set of primary memory units; and transferring the common source data to the target subset of primary memory units via the combination of broadcast buses by, for each broadcast bus in the combination of broadcast buses:

selecting a data transfer mode in a set of data transfer modes comprising:

a unicast data transfer mode; and a multicast data transfer mode; and transferring the common source data to a primary memory unit in the target subset of primary memory units via the broadcast bus according to the data transfer mode.

* * * * *